United States Patent
Lange et al.

(10) Patent No.: US 7,861,983 B2
(45) Date of Patent: Jan. 4, 2011

(54) COLD-INSULATED FIXED-POINT SUPPORT

(75) Inventors: Heinz-Wilhelm Lange, Zeven (DE); Ashley Challenor, Perth (AU)

(73) Assignee: Lisega Aktiengesellschaft, Zeven (DE)

( * ) Notice: Subject to any disclaimer, the term of this patent is extended or adjusted under 35 U.S.C. 154(b) by 438 days.

(21) Appl. No.: 11/886,994

(22) PCT Filed: Mar. 22, 2006

(86) PCT No.: PCT/DE2006/000511
§ 371 (c)(1),
(2), (4) Date: Sep. 24, 2007

(87) PCT Pub. No.: WO2006/099855
PCT Pub. Date: Sep. 28, 2006

(65) Prior Publication Data
US 2009/0095847 A1    Apr. 16, 2009

(30) Foreign Application Priority Data
Mar. 22, 2005   (DE)   ........................ 10 2005 013 728

(51) Int. Cl.
*F16L 3/08* (2006.01)
(52) U.S. Cl. .......................... 248/74.4; 248/55; 248/62; 138/106; 138/149
(58) Field of Classification Search .................. 138/106, 138/149; 248/74.1, 74.4, 55, 62, 67.5, 74.2
See application file for complete search history.

(56) References Cited
U.S. PATENT DOCUMENTS

| | | | | |
|---|---|---|---|---|
| 3,563,503 A | * | 2/1971 | Lancaster | ................ 248/49 |
| 3,891,006 A | * | 6/1975 | Lee | ............................. 138/106 |
| 4,323,088 A | * | 4/1982 | McClellan | .................. 138/106 |
| 4,530,478 A | * | 7/1985 | McClellan | ..................... 248/62 |
| 4,804,158 A | * | 2/1989 | Collins et al. | .............. 248/74.4 |
| 5,020,481 A | * | 6/1991 | Nelson | ........................ 122/494 |
| 5,924,656 A | | 7/1999 | Okada et al. | |
| 7,472,870 B2 | * | 1/2009 | Zagorski et al. | ............... 248/65 |
| 2002/0060274 A1 | * | 5/2002 | Klezath | ....................... 248/58 |
| 2003/0213525 A1 | * | 11/2003 | Patel et al. | ................... 138/149 |
| 2005/0253024 A1 | | 11/2005 | Zagorski et al. | |

FOREIGN PATENT DOCUMENTS
EP    0 518 227 B1    12/1992

* cited by examiner

*Primary Examiner*—Terrell Mckinnon
*Assistant Examiner*—Bradley H Duckworth
(74) *Attorney, Agent, or Firm*—Miles & Stockbridge P.C.; David R. Schaffer, Esq.

(57) ABSTRACT

The invention relates to a cold-insulated fixed-point pipe support for a low-temperature pipeline which includes an insulating system arranged between an outer shell and a supportable low-temperature pipeline having solid thermal insulating material which thermally insulates the pipeline from the low-temperature environment. A rotation-preventing and displacement-preventing device prevents rotation and displacement of the thermal insulating material with respect to the pipeline and an outer shell. A fixed-point pipe support is adapted to be fitted and removed in a substantially radial direction over the pipeline, and has at least one division with respect to shape with a division plane thereof extending perpendicular to a cross-sectional plane, and having a connecting device for releasable connecting and fixing shaped parts formed by the division.

31 Claims, 5 Drawing Sheets

COLD-INSULATED FIXED-POINT SUPPORT

BACKGROUND OF THE INVENTION

The invention relates to a cold-insulated fixed-point pipe support for a pipeline, in particular for a low-temperature pipeline, which for absorbing and transmitting axially and radially acting pipeline forces and moments can be fixed on the pipeline and on a base, comprising an insulating system which is arranged between an outer shell and a supportable low-temperature pipeline and which has a thermal insulation of solid insulating material and thermally insulates the supportable low-temperature pipeline from the environment, and comprising a rotation-preventing and displacement-preventing means for preventing rotation and displacement of the thermal insulation with respect to the supportable low-temperature pipeline and the outer shell.

Fixed-point pipe supports are used in particular as anchor points at portions of the pipeline where as far as possible all mechanical forces and moments which are built up due to the configuration of the pipeline are to be absorbed in order that the pipeline can be appropriately connected adjoining same in a force-free manner for example to an assembly such as a pump. A fixed-point pipe support of the kind set forth in the opening part of this specification is described for example in U.S. Pat. No. 3,891,006. In that arrangement the thermal insulation is injected into position between the pipeline and the outer shell or is pushed in the form of a prefabricated component at the end over a pipe portion. Because of the complex structure a fixed-point pipe support of that kind is generally already prefabricated in the factory, with an inwardly disposed pipeline portion, and inserted into a pipeline on site. For that purpose in practice it frequently happens that either the pipeline construction has to be stopped until the appropriate fixed-point pipe support is ready for incorporation on site or a suitable portion has to be removed from an existing pipeline, the fixed-point pipe support fitted and the pipeline then subjected to mostly renewed, additional pressure testing and/or destruction-free testing. Similarly, to replace a fixed-point pipe support, the defective fixed-point pipe support has to be cut out of the pipeline in order then to weld the new fixed-point pipe support into the pipeline again at that location, this being a very complicated and expensive procedure which once again requires renewed pipeline pressure testing and/or destruction-free testing. Overall therefore the fitment and removal of a fixed-point pipe support is complicated and expensive and can easily have a time-wasting effect on the assembly of a cold-insulated pipeline, in particular a low-temperature pipeline.

The object of the invention is therefore that of simplifying the fitting and removal of a fixed-point pipe support of the kind set forth in the opening part of this specification to and from a pipeline respectively, in particular a low-temperature pipeline.

In accordance with the invention the specified object is attained in that the fixed-point pipe support is adapted to be fitted and removed in a substantially radial fitting direction over the pipeline, the fixed-point pipe support has at least one division in respect of shape, the division plane of which extends perpendicularly to the cross-sectional plane, and the fixed-point pipe support has a connecting device for releasably connecting and fixing the shaped parts formed by the division in respect of shape.

SUMMARY OF THE INVENTION

The proposed division in respect of shape means that the fixed-point pipe support can be pushed on, pulled on or fitted on in situ over a pipeline which has already been assembled, in a radial direction or in a substantially radial direction, so that installation of the fixed-point pipe support can be effected flexibly in terms of time without delaying pipeline construction with a further pressure test. In that respect the shaped parts thereof can be held together over the pipeline by way of the connecting device and preferably adjustably pressed against the pipeline or removed from the pipeline again, by way of releasing the connecting device. If moisture from the air penetrates into the insulating system it freezes in the case of low-temperature pipelines and in that case can destroy the insulating system so that it has to be replaced. For that purpose, when dealing with conventional fixed-point pipe supports, the entire support with the pipeline portion which is guided through the fixed-point pipe support would have to be cut out of the pipeline, replaced, welded in position and subjected to a renewed pressure test. That is eliminated with the fixed-point pipe support according to the invention as it is fixed releasably on the pipeline, with its outer shell and its thermal insulation or its insulating system.

For greater ease of fitting or removing the fixed-point pipe support and for simplifying the fixed-point pipe support structure, the division in respect of shape should be so selected that the fixed-point pipe support does not involve any undercut configurations in relation to its fitting direction when being pushed on or released. For that purpose desirably the longitudinal axis of the fixed-point pipe support should lie in the division plane. A further simplification can be achieved if the thermal insulation and the outer shell have a common division plane.

Preferably the thermal insulation can have two semicircular shells whose side faces which are disposed in the division plane adjoin each other by way of a joint. Thermally induced changes in volume of the thermal insulation and/or the outer shell can be compensated by way of that joint. In that respect, by virtue of the radial thermal gradient prevailing, those changes in volume can occur appropriately distributed over the radius. In order to prevent moisture from the air penetrating into the joint, which by virtue of freezing thereof would lead at least to partial destruction of the thermal insulation, it is proposed that the joint is filled with an elastic sealing material.

In order further to minimise the danger of moisture from the air penetrating into the joint, the joint can be made up of a plurality of stepped radial and axial joint portions, wherein the radial joint portions are filled with an elastic sealing material and the side faces of the shells, which adjoin in the axial joint portions, bear against each other. That blocks direct access for moisture from the air, into the joint. For that purpose the peripheral side faces, which define the joint, of the portions or halves of the thermal insulation can be of a stepped configuration which, forming axial and radial joint portions, engages into each other.

In a preferred development of the stepped structure of the joint, there can be provided at the radially outer end of the joints a respective step-shaped joint enlargement which is preferably provided at both sides of the joint and into which is fitted a further portion of the thermal insulation, which portion is adapted to the joint enlargement and like the joint extends in the axial direction. By virtue of that configuration the portion of the thermal insulation covers over the radially inwardly disposed and enlarged part of the division joint outwardly and blocks the direct path into the division joint for moisture from the air and other ambient media. Preferably the portion of the thermal insulation bears with one of its two peripheral side faces against the side face, which is in opposite relationship to that side face, of the rest of the thermal insulation while, with its other peripheral side face and the correspondingly opposite side face of the thermal insulation, it encloses a radial joint portion. Preferably that joint portion is also filled with an elastic sealing material.

In order to ensure optimised connection to the insulating system of the pipeline to the fixed-point pipe support it is proposed that the thermal insulation in a development of the fixed-point pipe support projects in the axial direction beyond the outer shell. In that case the connection to the insulating system of the pipeline can be improved in that there is provided a preferably stepped configuration for the adjoining end faces to produce correspondingly stepped radial and axial joint portions in order in that way to prevent direct access for moisture from the air. It can further be provided that the radial joint portions are filled with elastic sealing material.

In order for example to more easily produce the stepped configuration of the end face, it can be provided that the thermal insulation is of a multi-shell coaxial structure, wherein the radial thickness and axial extent of the individual shells are preferably adapted to the stepped structure.

Preferably the thermal insulation is cut out of a prefabricated polyurethane foam block. In another variant of the procedure the polyurethane foam can also be foamed directly into the intended one-piece form. In both cases the prefabricated polyurethane foamed block or the one-piece form after foaming thereof can be aged for hardening purposes and to reduce internal stresses. Preferably in that respect polyurethane foam blocks of high density (polyurethane foam high density or PUF-HD) are used in order by way thereof to be able to absorb greater forces which are correspondingly to be expected in the case of a relatively large pipeline.

In order to fixedly connect the thermal insulation or the insulating system to the portion of the pipeline which passes through the fixed-point pipe support and to the outer shell, it is proposed in accordance with the invention that the rotation-preventing and displacement-preventing means has an outer receiving means and an inner receiving means for the insulating system, wherein the outer receiving means is fixedly connected to the outer shell and the inner receiving means in the working position is fixedly connected to the pipeline. The inner receiving means is intended to provide that radial and axial forces as well as force moments about the longitudinal axis of the pipeline are to be transmitted from the pipeline to the insulating system which passes those forces by way of the outer receiving means to the outer shell which is connected to the base. Absorption of bending moments about a bending axis in the cross-sectional plane is achieved predominantly by virtue of the fixed-point pipe support being of a sufficiently long axial length.

Preferably the receiving means each have at least one peripherally extending rib and at least one axially extending rib. Also the insulating system is provided with recesses which are adapted to the ribs and into which the ribs engage in the installed condition. Preferably the ribs engage completely and to such an extent that the ribs project into the recess to or close to the bottom of the receiving means. In a manner corresponding to the coaxial structure of the fixed-point pipe support, it is proposed that the ribs of the outer receiving means extend radially inwardly and the ribs of the inner receiving means extend radially outwardly. For reasons of stability of the receiving means and in order to pass the forces which occur to the insulating system under a material-compatible pressure, it is proposed that the receiving means respectively have at least two peripheral ribs arranged at a mutual spacing and four axial ribs arranged distributed uniformly over the periphery, wherein the axial ribs preferably bear with their ends against a side face of the peripheral ribs and are fixedly connected thereto. That increases the rigidity of the connection. The uniform arrangement of the four axial ribs distributed over the periphery implies a centre point angular spacing of 90°.

For more easily mounting the inner receiving means to the pipeline and in order to be able to introduce the outer receiving means into the divided outer shell, the two receiving means can be respectively divided into two receiving means halves, wherein their respective division plane extends perpendicularly to the cross-sectional plane and contains the longitudinal axis of the receiving means. In that way the inner receiving means can be laterally fitted on to the pipe portion in question and assembled, in which case the ribs are preferably welded to the pipeline portion. Likewise the faces of the inner receiving means, which faces adjoin each other at the ends, can be welded together. The individual ribs of the inner receiving means however can also be welded individually on to the pipe, for assembly thereof. In order to avoid corner or gusset welds which are undesirable from the point of view of a welding procedure, in another variant the axial ribs can be fixed on the pipeline at a given end spacing in relation to the peripheral ribs. In order to reduce the feed of heat into the pipeline by virtue of the operation of welding on the ribs, it can also be provided that only at least peripheral and/or at least one radial rib are welded to the pipeline, in which case the unwelded ribs are welded to at least one rib which is welded to the pipeline, for the unwelded ribs to be held in position. Upon replacement of the insulating system or the thermal insulation and/or the outer shell, which for example is to be welded to another base, the inner receiving means itself can remain on the pipeline.

In order to avoid the formation of an undercut configuration in respect of the thermal insulation, a respective one of the peripheral end faces, which are disposed in the division plane, of the receiving portions of the inner and/or outer receiving means can be formed by one of its axial ribs. By virtue of that arrangement the joint between the half-shells of the thermal insulation meets a respective axial rib radially inwardly and radially outwardly respectively, whereby stability is improved and direct access into the joint from the exterior is at least rendered more difficult.

Preferably however the axial ribs of the outer receiving means are arranged at a centre point angular spacing of 45° relative to the division plane. In that way in the installed position the axial ribs are arranged displaced through 45° relative to the axial ribs of the inner receiving means in the fixed-point pipe support. To avoid undercut configurations in that case the axial ribs of the outer receiving means are in the form of an isosceles, right-angled angular profile, wherein the two limbs of the angular profile are connected with their free ends to the inside of the outer shell and come together radially inwardly enclosing a hollow space between the angular profile and the inside of the outer shell. In that way the outer faces of the angular profile, which face towards the thermal insulation, respectively extend perpendicularly or parallel to the division plane of the outer profile and the outer shell so that, in spite of the 45°-displaced position of the axial ribs, no undercut configuration is formed by the axial ribs. Accordingly the halves of the outer receiving means can be placed on or removed from the thermal insulation in perpendicular relationship to the division plane without damaging the thermal insulation or without additional shaped parts being required to fill up undercut configurations. The hollow space afforded between the angular profile and the inside of the outer shell is preferably foam-filled with heat-insulating plastic material. In that respect once again preferably polyurethane foam is employed. For foam-filling the hollow space provided through the limbs of the angular profile or through the portion of the peripheral rib to which the axial rib is connected at the ends are two openings, one as an injection opening for injection of the foam into the hollow space and one as a venting opening for venting the hollow space when injecting the foam material. For that purpose the injection opening can desirably be provided in the portion of the peripheral rib.

The connecting device can have for example peripheral bands which are laid over the outside of the outer shell and tensioned. Preferably however the connecting device has a screw connection which connects the shaped parts of the outer shell together in the peripheral direction and therewith the thermal insulation or insulating system which is connected to the outer shell in force-locking and positively locking relationship, and preferably also braces same. For that purpose the screw connection can have projections which are fixed to the outside and near the division plane of the outer shell and preferably extend radially outwardly in perpendicular relationship to the direction of the maximum force to be expected and thus here in parallel relationship with the division plane, in such a way that they are disposed in opposite relationship in pairs. The projections can have a screw opening in the peripheral direction, through which screws are guided and screwed for connection of the projections which are respectively disposed in opposite relationship in pairs. In that case an additional lock nut or a securing washer for securing the screw connection can preferably be provided. The screw connection can additionally be biased by way of a spring device in order by way thereof to permit compensation in respect of thermally induced changes in size of the shaped parts. For that purpose the spring device can have at least one plate spring which is preferably arranged between the screw head and the side face of the projection, that is adjacent to the screw head. That can also ensure that the screw connection holds the shaped parts together with tensile forces that remain approximately the same. Instead of or in addition to the plate spring it can be provided that a tension spring bridging over the gap braces together the half-shells of the shaped parts, wherein the tension spring can also be held by projections like that of the above-mentioned screw connection.

The inner receiving means can preferably be made from high-quality steel. Because of the advantage of the same material properties such as thermal expansion, welding characteristics and corrosion characteristics, the inner receiving means should be made from the same material as the pipeline portion which is supported in the fixed-point pipe support. To reduce manufacturing costs, it is sufficient for the outer receiving means and the outer shell to be made from a non-alloyed steel, preferably a steel provided with a surface protection, in which case preferably both the receiving means and the outer shell should be of the same steel. In that respect pot galvanising is preferred as the surface protection.

In a development of the insulating system at least the surfaces of the thermal insulation, which face outwardly in the installed position, are sealed with a cryogenic vapour barrier of elastomer mastic. Preferably at least the outwardly facing surfaces of the thermal insulation are of a fire-retardant nature.

The outwardly facing surface of the thermal insulation can be sealed with a laminated aluminium/polyester film. For that purpose the aluminium/polyester film can preferably be glued to the surface. In a development the film is of such a dimension that in the installed condition it at least partially covers over a pipeline insulation adjoining it at the construction side. That provides that the radial joint between the fixed-point pipe support and the adjoining pipeline insulation is also covered over.

Desirably the outer shell can be fixedly connected to the base for fixing the fixed-point pipe support, with its outside. For that purpose the base can have for example three U-shaped profiles which are arranged in the axial direction and displaced through 90° around the outer shell and which with their free limb ends engage the outer shell. Because of the high forces which are expected to occur the outer shell is desirably welded to the base.

It can desirably be provided in that respect that the division plane is so arranged that it ends at an approximately 45° centre point angular spacing between two U-shaped profiles. If in contrast there is only one engagement point for the base, for example a U-shaped profile, to the outside of the outer shell, the division plane should be arranged displaced with respect to the base at a centre point angle of 90°, for symmetrical transmission of forces and moments. It will be appreciated that the division plane can also be positioned in any other centre point angular spacing relative to the base.

The present invention is illustrated by way of example in the drawing and described in greater detail hereinafter with reference to the Figures in which corresponding components are denoted by the same references. In the drawing:

DETAILED DESCRIPTION OF THE INVENTION

Figure 1:
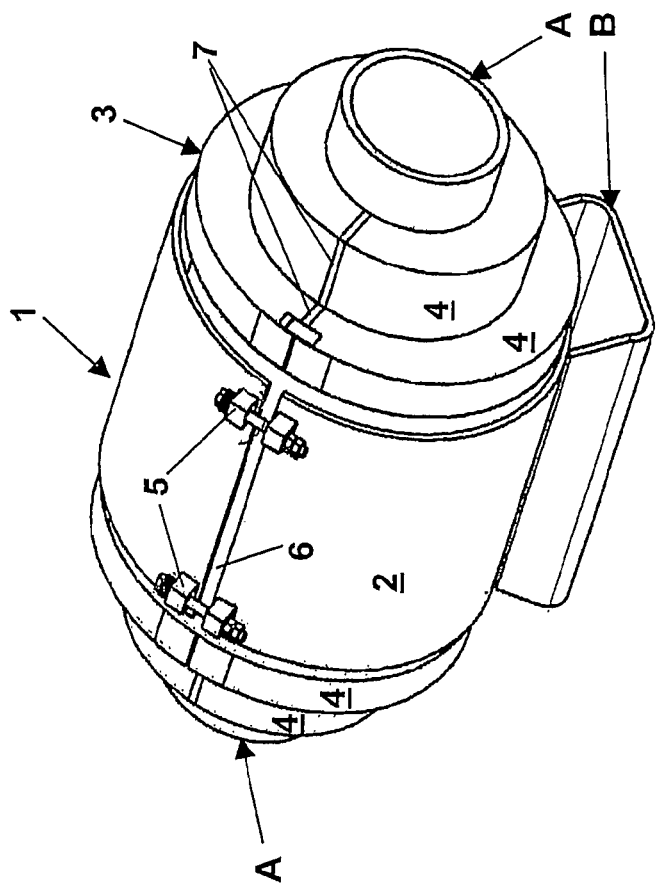
FIG. 1 shows a perspective view of a cold-insulated fixed-point pipe support in a first embodiment.

FIG. 1 is a diagrammatic perspective view of a cold-insulated fixed-point pipe support 1 for a low-temperature pipeline A as well as a portion of the pipeline A, which passes through the pipe support 1, and a foot C associated with the base B. In the installed position of the pipe support 1 the foot C is fixedly connected to the base B and the pipe support 1. The pipe support 1 has an outer shell 2 and an insulating system 3 which is arranged between the outer shell 2 and the pipeline A and which thermally insulates from the environment, the low-temperature pipeline A which can be supported in the pipe support 1. The end faces of the thermal insulation 4 are of a stepped structure which serves for the connection to an insulation (not shown here) of an adjoining portion (not shown here) of the pipeline A, by virtue of the insulation (not shown here) overlapping the thermal insulation 4 at the ends.

The insulating system 3 has a thermal insulation 4 which is cut out of an aged and hardened polyurethane foam block. The outer shell 2 and the thermal insulation 4 are each cut into two half-shells 16, the division plane E of which extends perpendicularly to the cross-sectional plane and includes the longitudinal axis of the coaxially constructed fixed-point pipe support 1. The two half-shells 16 of the outer shell 2 are releasably connected together by way of a connecting device in the form of a screw connection 5. For fitting the pipe support 1 on the pipeline A the half-shells 16 of the outer shell 2 and the thermal insulation 4 can be mounted laterally on to the pipeline A in a radial fitting direction a and pressed against each other by way of the screw connection 5, as can be seen from FIG. 3, an exploded view of the pipe support 1 without thermal insulation 4. In that respect the half-shells 16 of the outer shell 2 are so dimensioned that their adjacent axial side faces are spaced by a gap 6 which is bridged over by the screw connection 5. By tightening the screw connection 5, it is thus possible to set a desired pressure with which the outer shell 2 acts on the insulating system 3 or on the thermal insulation 4 and with which the fixed-point pipe support 1 is held. In that way possible thermally induced changes in volume of the outer shell 2 and the insulating system 3 in the peripheral and radial directions can be compensated. The side faces of the half-shells 16, which are in the division plane, form a joint 7, the more precise structure of which is further described hereinafter. The joint 7 is arranged rotated relative to the base B, at a centre point angular spacing of about 45°, wherein in particular in an arrangement comprising a plurality of fixed-point pipe supports 1 in mutually juxtaposed relationship, that affords better accessibility to the screw connection 5. It will be readily apparent from the construction of the fixed-point pipe support 1 however that in principle any other centre point angular spacing is possible.

Figure 2:
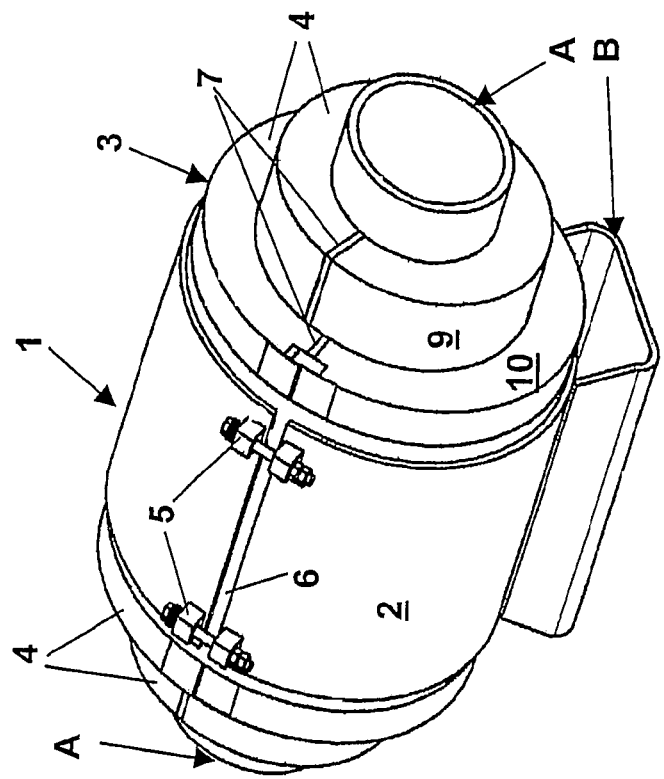
FIG. 2 shows a perspective view of a cold-insulated fixed-point pipe support in a second embodiment.

FIG. 2 shows a diagrammatic perspective view of a further embodiment of the fixed-point pipe support 1. As a departure from the embodiment of the fixed-point pipe support 1 shown in FIG. 1, the embodiment illustrated in FIG. 2 has a two-shell thermal insulation 4 with an inner insulating shell 9 and an outer insulating shell 10, wherein the two insulating shells 9, 10 are arranged rotated relative to each other through a given centre point angular distance. In that way the two joints 8 formed by the insulating shells 9, 10 are peripherally displaced relative to each other so that the direct path from the exterior to the pipeline A through the joint 7 is interrupted. In that case however it is necessary for the two insulating shells 9, 10 to be arranged non-rotatably relative to each other to form the fixed-point pipe support 1, and that can be achieved for example by glueing (not further shown here) or by a tooth configuration, hooking engagement and/or latching engagement (also not shown here) of the two mutually adjoining surfaces of the insulating shells 9, 10.

Further FIGS. 3 to 7 relate to the configuration of the fixed-point pipe support shown in FIG. 1, but in this case the stepped configuration of the end faces of the thermal insulation 4 has been omitted for greater clarity of the drawing.

Figure 3:
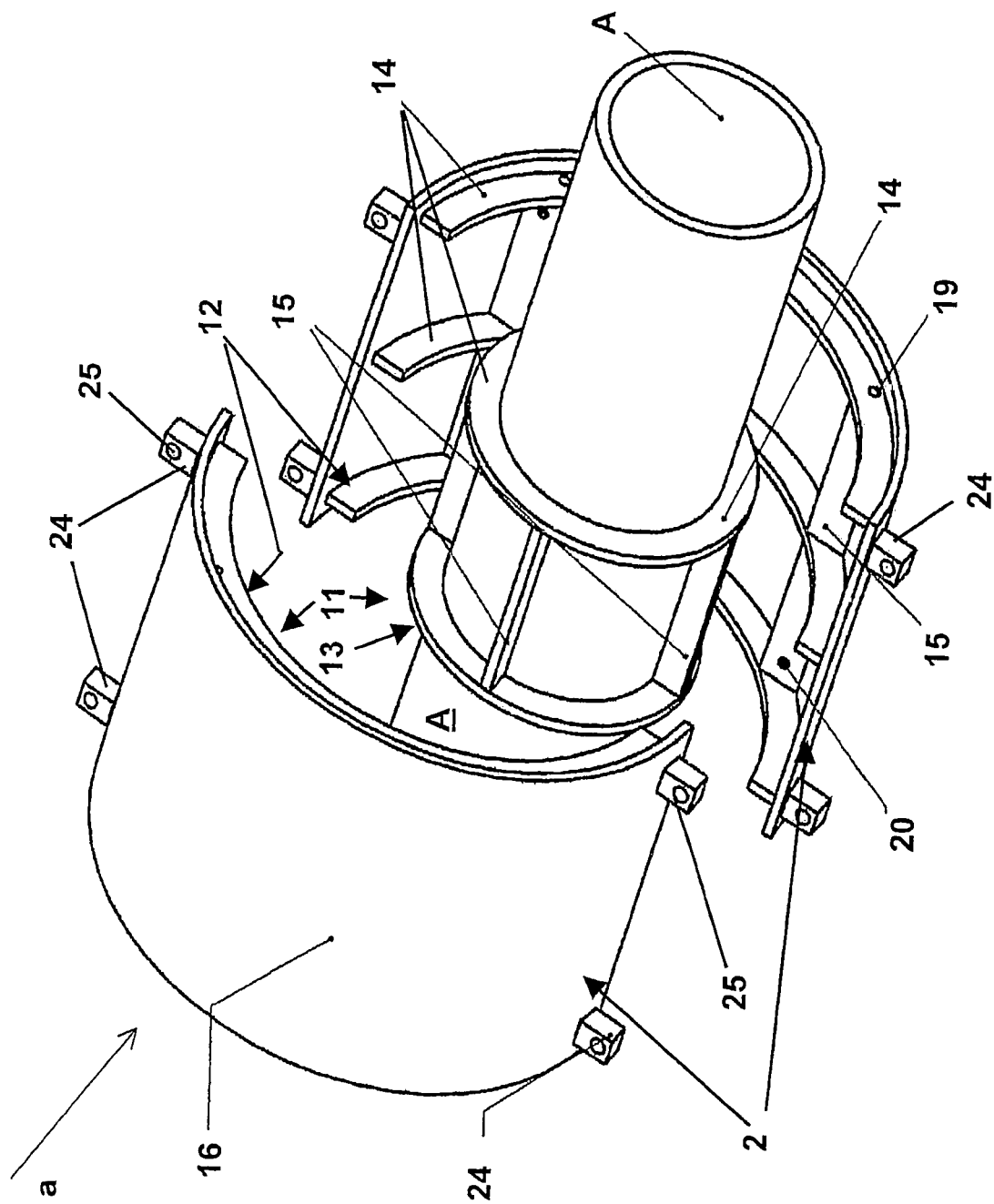
FIG. 3 shows a perspective view of parts of the fixed-point pipe support of FIG. 1 as an exploded view.

FIG. 3, besides the portion of the pipeline A, shows the half-shells 16 of the outer shell 2 as well as a rotation-preventing and displacement-preventing means 11 for preventing rotation and displacement of the thermal insulation 4 with respect to the pipeline A and the outer shell 2. The rotation-preventing and displacement-preventing means 11 has an outer receiving means 12 and an inner receiving means 13 for the insulating system 3 or the thermal insulation 4, wherein the outer receiving means 12 is welded to the outer shell 2 and the inner receiving means 13 is welded to the pipeline A. The two receiving means 12, 13 have peripherally extending ribs 14 and axially extending ribs 15. In this case, the axial ribs 15 bear with their ends against a respective side face of the peripheral ribs 14 and are fixedly connected thereto. The axial ribs 15 are uniformly distributed over the periphery at a centre point angular spacing of 90°. In this case the axial ribs 15 of the inner receiving means 13, as indicated in FIG. 3 by the positioning of the components relative to each other, are rotated with respect to the axial ribs 15 of the outer receiving means 12 through a centre point angular spacing of 45° relative to each other.

Figure 4:
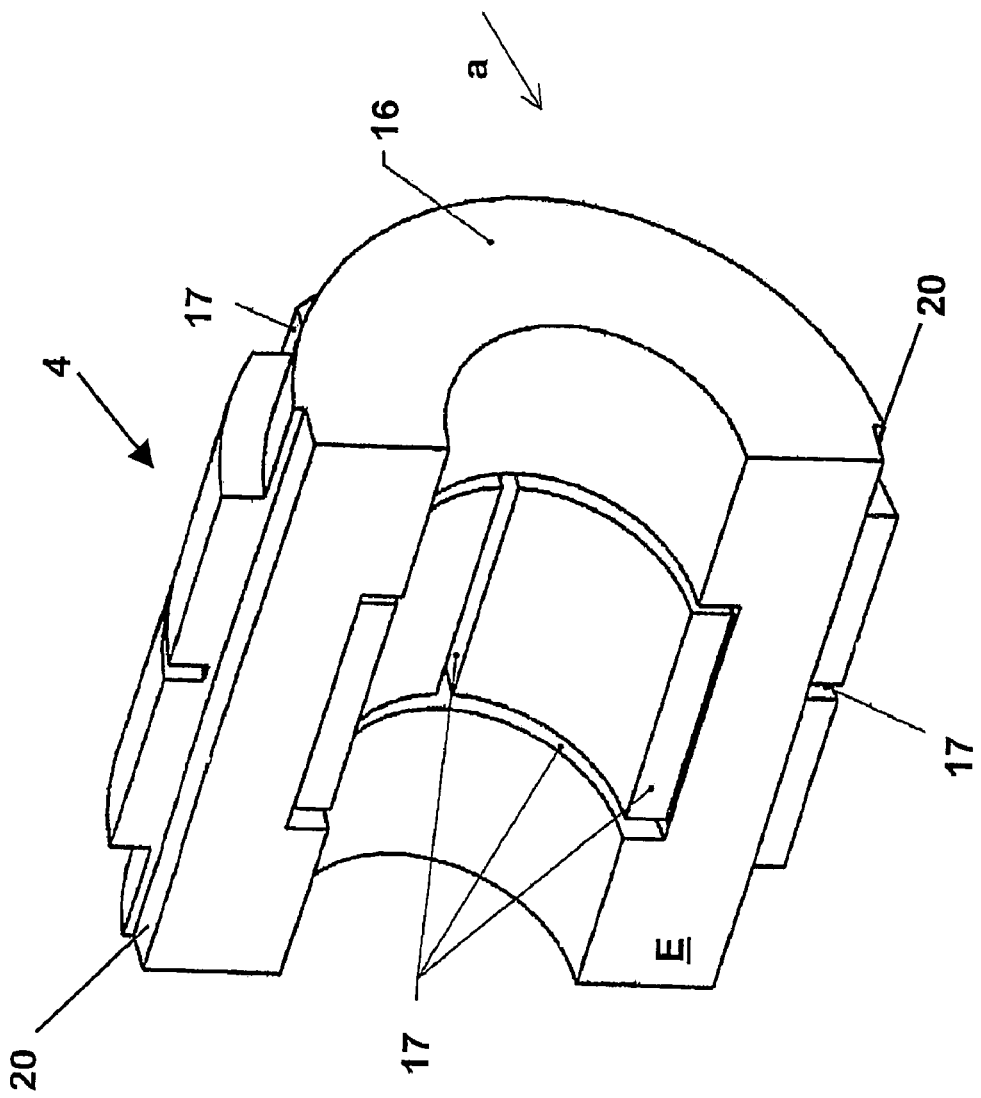
FIG. 4 shows a perspective view of a half-shell of a thermal insulation of the pipe support of FIG. 1 but without an axially extending projecting portion.

FIG. 4 shows a perspective view of a half-shell 16 of the thermal insulation 4. In this case, at its radially inwardly disposed and radially outwardly disposed surfaces, the half-shell has groove-shaped recesses 17 into which, in the installed condition, the ribs 14, 15 of the outer receiving means 12 and the inner receiving means 13 engage for non-rotatably and non-displaceably supporting the half-shell 16 between the receiving means 12, 13.

Figure 5:
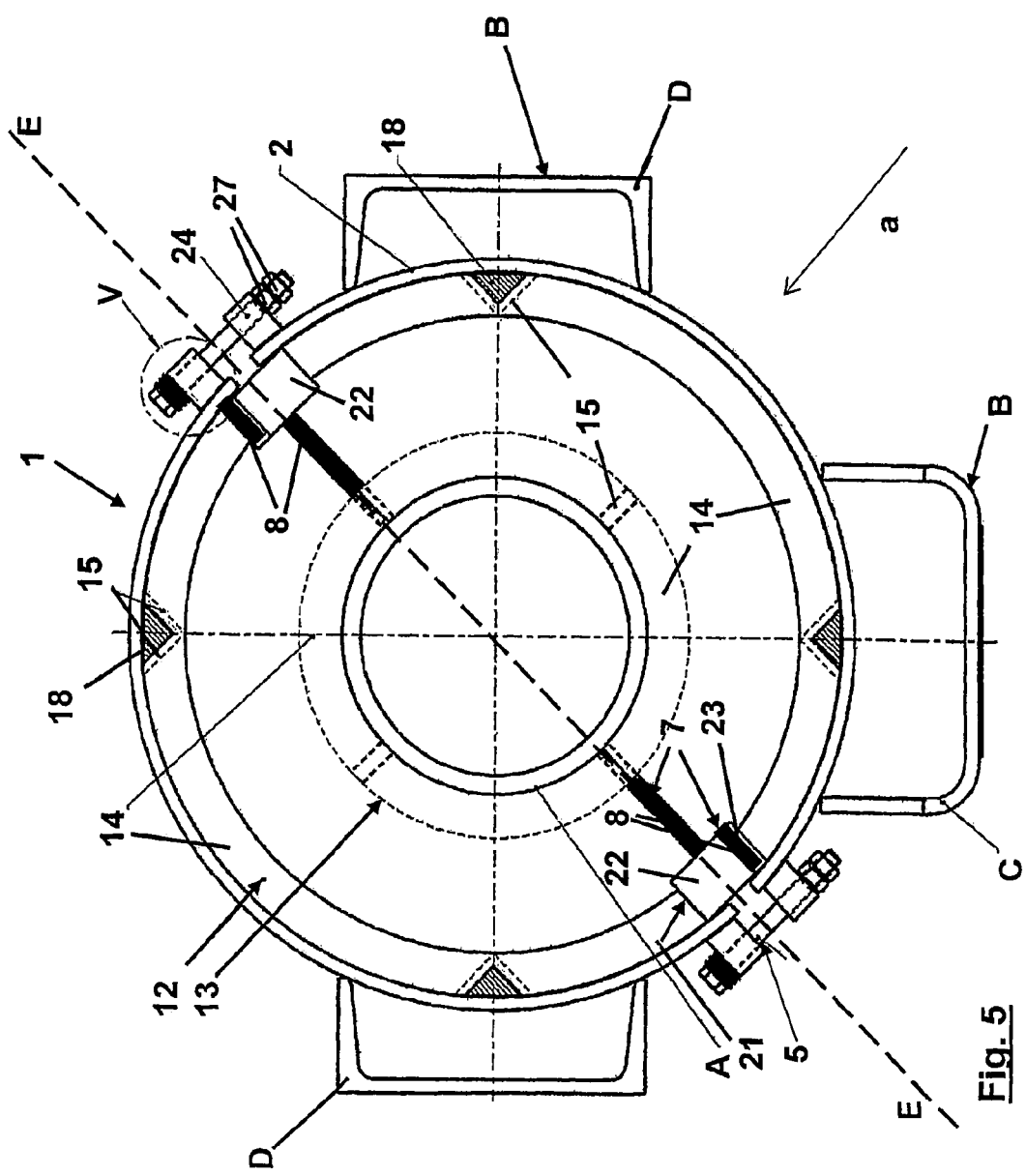
FIG. 5 shows a cross-sectional view of the fixed-point pipe support as shown in FIG. 1 with additional lateral base elements.

FIG. 5 shows a cross-sectional view of the fixed-point pipe support 1 shown in FIG. 1, in which case however the pipe support 1, in addition to the foot C, is also fixedly welded to the base B by way of two lateral supports D. In this case the foot C and the supports D respectively engage the outer shell 2 of the pipe support 1, with the free ends of their limbs. The relative position of the respective four axial ribs of the outer receiving means 12 and the inner receiving means 13 is clearly visible in FIG. 4, in which respect, as already mentioned, they are arranged in displaced relationship through a centre point angle of 45°. Two of the axial ribs 15 of the inner receiving means 13 are arranged in the common division plane E of the outer shell 2 and the thermal insulation 4 while the two axial ribs 15 of the inner receiving means 13 are positioned in perpendicular relationship thereto. That means that, in regard to the mounting direction a for fitting the half-shells 16 of the thermal insulation 4, the axial ribs 15 do not form any undercut configuration which would damage the thermal insulation 4 in the assembly procedure or would require an additional shaped part.

The axial ribs 15, which are arranged displaced through 45°, of the outer receiving means 12 have an isosceles, right-angled angular profile, wherein the two limbs of the angular profile are connected with their free ends to the inside of the outer shell 2 and come together radially inwardly with the enclosure of a hollow space 18 between the angular profile and the inside of the outer shell 2. Accordingly, the outer faces of the angular profile, which face towards the thermal insulation 4, respectively extend in perpendicular or parallel relationship with the division plane E so that the halves of the outer receiving means can be fitted to or removed from the thermal insulation 4 perpendicularly to the division plane E in the assembly direction a, without having an undercut configuration for that purpose. The hollow space 18 is foam-filled with a polyurethane foam, for which purpose an injection opening 18 for injection of the foam into the hollow space 18 is provided in the end of the axial ribs 15 of the outer receiving means 12 while a venting opening 20 for venting the hollow space 18 upon injection of the foam material is provided in the wall.

The joints 7 are filled with an elastic sealing material 8 in order by way thereof on the one hand to prevent moisture from the air from passing into the interior of the thermal insulation 4 which would freeze there and would destroy the thermal insulation 4 and in order on the other hand to compensate for thermally induced changes in volume of the outer shell 2 and the thermal insulation 4. The joints 7 butt radially inwardly against the axial rib 15, which is provided there, of the inner receiving means 13, whereby a further barrier against the ingress of moisture from the air is created. Provided at the radially outer ends of the respective joints 7 is a stepped joint enlargement 21 which extends on both sides and into which is fitted a further portion 22 of the thermal insulation 4, which portion is adapted to the joint enlargement 21 and extends in the axial direction in a manner corresponding to the joint 7. That portion 22 covers over the non-enlarged portion of the joint 7. In this case the portion 22 bears with one of its two peripheral side faces against the thermal insulation 4 while its other peripheral side face and the thermal insulation 4 enclose a radial joint portion 23. That joint portion 23 is also filled with an elastic sealing material 8 of elastomer mastic, like the rest of the joint 7. That arrangement provides overall for a stepped configuration for the joint 7 with the joint portion 23, which prevents moisture from the air from penetrating into the thermal insulation 4.

Figure 6:
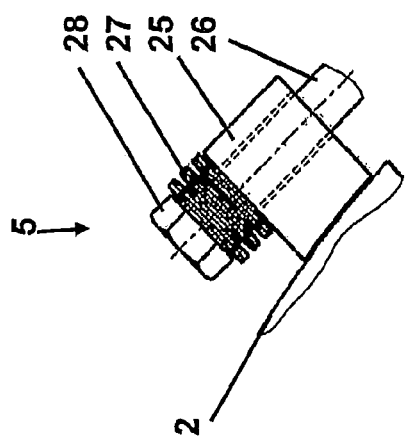
FIG. 6 shows a side view of a portion V as shown in FIG. 4.

The structure of the screw connection 5 is clearly shown in FIG. 1 and in particular in FIGS. 5 and 6. For that purpose the screw connection 5 has projections 24 which are fixed to the outside of and near the division plane E of the outer shell 2 and extend perpendicularly to the direction of the maximum force to be expected and thus outwardly substantially parallel to the division plane E so that they are disposed in opposite relationship in pairs with respect to the division plane E. The projections 24 each have a respective screw opening 25 which extends in the peripheral direction and through which a screw 26 is passed and screwed to a screw nut 27 for connecting the respective projections 24 disposed in opposite relationship in pairs. An additional screw nut 27 serves for locking the screw connection 5. The screw connection 5 is biased by way of a spring device which here is in the form of plate springs 28, wherein the plate springs 28 are arranged between the screw head 29 of the screw and the side face of the projection 25, that is adjacent to the screw head 29, and are supported there, whereby the screw connection is biased. That arrangement ensures that the screw connection 5 holds the two half-shells 16 of the outer shell 2 together under tensile forces which remain approximately the same so that the half-shells 16 exert a pressure which remains approximately uniform, for holding together and fixing the insulating system 3 or the thermal insulation 4, on the inner receiving means 13 which is welded to the pipeline A.

Figure 7:
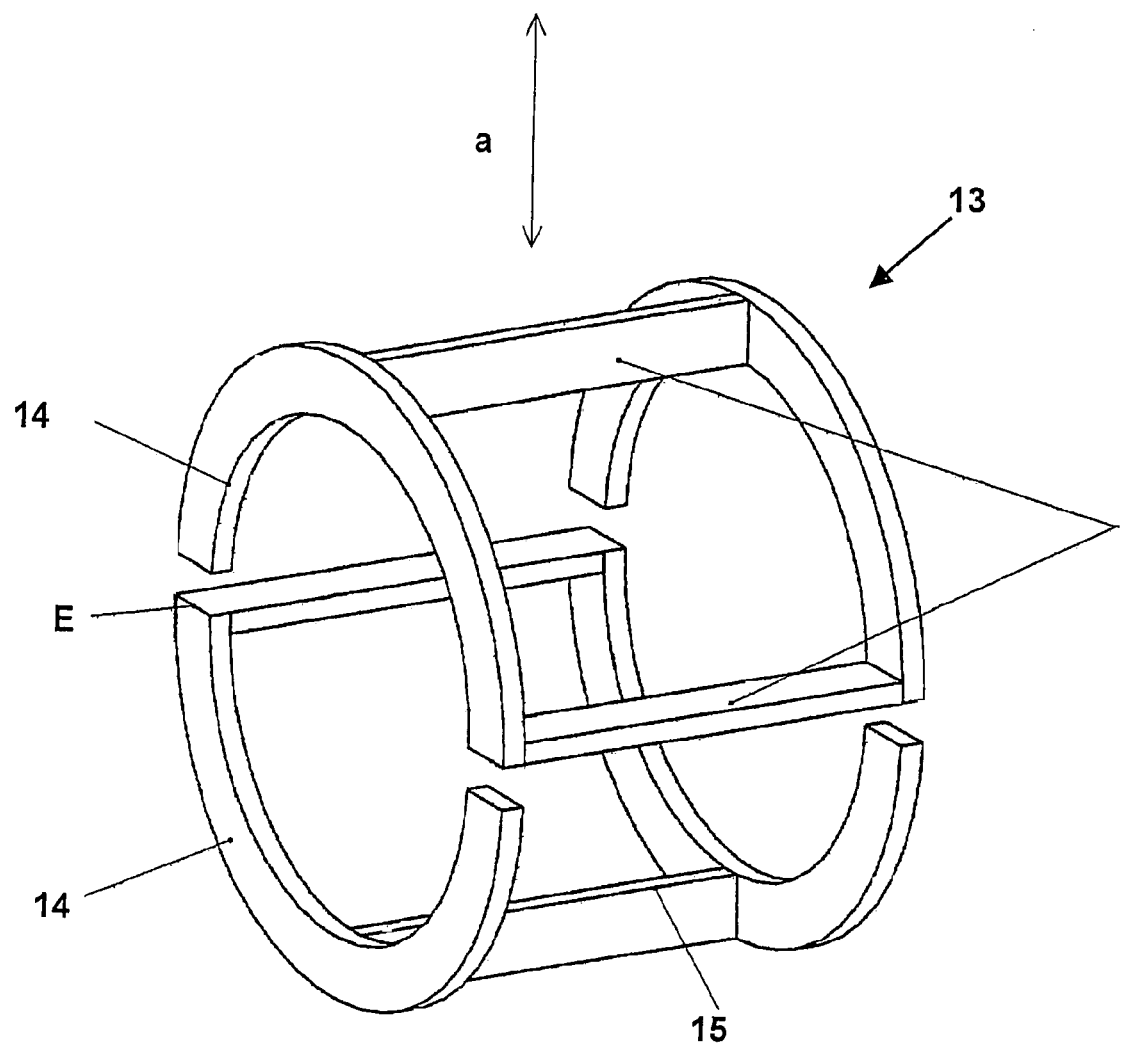
FIG. 7 shows an inner receiving means as shown in FIG. 3 but divided into two halves.

FIG. 7 shows an individual view illustrating the inner receiving means 13 with the two halves thereof, wherein the division plane E, as already described hereinbefore, extends in such a way that a respective axial rib 15 of one half extends in the division plane E while the other axial rib 15 of the respective half of the inner receiving means 13 extends perpendicularly thereto.

Although a preferred embodiment of the invention has been specifically illustrated and described herein, it is to be understood that minor variations may be made in the apparatus without departing from the spirit and scope of the invention, as defined by the appended claims.

LIST OF REFERENCES 1 fixed-point pipe support
2 outer shell
3 insulating system
4 thermal insulation
5 screw connection
6 gap
7 joint
8 sealing material
9 inner insulating shell
10 outer insulating shell
11 rotation-preventing and displacement-preventing means
12 outer receiving means
13 inner receiving means
14 peripheral rib
15 axial ribs
16 half-shell
17 recess
18 hollow space
19 injection opening
20 venting opening
21 joint enlargement
22 portion
23 joint portion
24 projection
25 screw opening
26 screw
27 screw nut
28 plate spring
29 screw head
A pipeline
B base
C foot
D support
E division plane
a assembly direction

What is claimed is:

1. A cold-insulated fixed-point pipe support for a pipeline (A), in particular for a low-temperature pipeline, which for absorbing and transmitting axially and radially acting pipeline forces and moments can be fixed on the pipeline (A) and on a base (B), comprising an insulating system (3) which is arranged between an outer shell (2) and a supportable low-temperature pipeline and which has a thermal insulation (4) of solid insulating material and thermally insulates the supportable low-temperature pipeline from the environment, and comprising a rotation-preventing and displacement-preventing means for preventing rotation and displacement of the thermal insulation (4) with respect to the supportable low-temperature pipeline and the outer shell (2), which has an outer receiving means (12) and an inner receiving means (13) for the insulating system (3), wherein the outer receiving means (12) is fixedly connected to the outer shell (2) and the inner receiving means (13) in the working position is fixedly connected to the pipeline (A), the fixed-point pipe support (1) is adapted to be fitted and removed in a substantially radial fitting direction (a) over the pipeline (A), the fixed-point pipe support (1) has shaped parts formed by at least one division, the division plane (E) of which extends perpendicularly to the cross-sectional plane, and the fixed-point pipe support (1) has a connecting device for releasably connecting and fixing the shaped parts formed by the division in respect of shape, the outer receiving means (12) has at least two peripheral ribs (14) arranged at a mutual spacing and four axial ribs (15) uniformly over the periphery, and the outer receiving means (12) is respectively divided into two receiving means halves, wherein its division plane (E) extends perpendicularly to the cross-sectional plane and contains the longitudinal axis of the inner and outer receiving means (12, 13), each of the four axial ribs (15) of the outer receiving means (12) comprising a centre point angular spacing of 45° relative to the division plane (E) and that the four axial ribs (15) of the outer receiving means (12) are in the form of an isosceles, right-angled angular profile with two limbs, wherein the two limbs of the angular profile are connected with their free ends to the inside of the outer shell (2) and come together radially inwardly enclosing a hollow space (18) between the angular profile and the inside of the outer shell (2), and wherein each limb of the axial ribs comprises an outer face facing towards the thermal insulation, the outer face of one of the two limbs of each axial rib extends perpendicularly to the division plane of the outer profile and the outer face of the other of the two limbs of each axial rib extends parallel to the division plane of the outer profile.

2. A fixed-point pipe support according to claim 1 characterised in that the longitudinal axis of the fixed-point pipe support (1) lies in the division plane (E).

3. A fixed-point pipe support according to claim 1 characterised in that the thermal insulation (4) and the outer shell (2) have a common division plane (E).

4. A fixed-point pipe support according to claim 1 characterised in that the thermal insulation (4) has two semicircular shells whose side faces are disposed in the division plane (E) and adjoin each other by way of a joint (7).

5. A fixed-point pipe support according to claim 4 characterised in that the joint (7) is filled with an elastic sealing material.

6. A fixed-point pipe support according to claim 4 characterised in that the joint (7) is made up of a plurality of stepped radial and axial joint portions (23), wherein the radial joint portions (23) are filled with an elastic sealing material (8) and the side faces of the shells, which adjoin in the axial joint portions (23), bear against each other.

7. A fixed-point pipe support according to claim 6 characterised in that there is provided at the radially outer end of the joints (7) a respective step-shaped joint enlargement (21) at both sides, into which is fitted a further portion (22) of the thermal insulation (4), wherein the further portion (22) extends in the axial direction.

8. A fixed-point pipe support according to claim 1 characterised in that the thermal insulation (4) projects in the axial direction beyond the outer shell (2).

9. A fixed-point pipe support according to claim 1 characterised in that the thermal insulation (4) is of a multi-shell coaxial structure.

10. A fixed-point pipe support according to claim 1 characterised in that the thermal insulation (4) is cut out of a prefabricated polyurethane foam block or is foamed directly into its predetermined form.

11. A fixed-point pipe support according to claim 1 characterised in that the insulating system (3) is provided with recesses (17) which are adapted to the ribs (14, 15) of the outer means (12) and into which the ribs (14, 15) of the outer means (12) engage in the installed condition.

12. A fixed-point pipe support according to claim 11 characterised in that the ribs (14, 15) of the outer receiving means (12) extend radially inwardly and the ribs (14, 15) of the inner receiving means (13) extend radially outwardly.

13. A fixed-point pipe support according to claim 1 characterised in that the receiving portions of the inner receiving means (13) display peripheral end faces, which are disposed in the division plane (E), and that at least one of the peripheral end faces of the receiving portions of the inner receiving means (13) is formed by one of the axial ribs (15).

14. A fixed-point pipe support according to claim 1 characterised in that the hollow space (18) is foam-filled with heat-insulating plastic material.

15. A fixed-point support according to claim 1 characterised in that the connecting device has a screw connection (5) which connects the shaped parts together in the peripheral direction.

16. A fixed-point pipe support according to claim 15 characterised in that the screw connection (5) has projections (24) which are fixed to the outside and close to the division plane (E) of the outer shell (2) and extend radially outwardly in such a way that they are disposed in regard to the division plane (E) in opposite relationship in pairs, wherein the projections (24) in the peripheral direction have a screw opening (25) through which screws (26) are passed and screwed for connecting the respective projections (24).

17. A fixed-point pipe support according to claim 15 characterised in that the screw connection (5) is biased by way of a spring device.

18. A fixed-point pipe support according to claim 17 characterised in that the spring device has at least one plate spring (28) which is arranged between the screw head (29) and the side face of the projection (24), that is adjacent to the screw head (29).

19. A fixed-point pipe support according to claim 1 characterised in that the inner receiving means (13) is made from high-quality steel.

20. A fixed-point pipe support according to claim 1 characterised in that the outer receiving means (12) and the outer shell (2) are made from pot-galvanised steel.

21. A fixed-point pipe support according to claim 1 characterised in that as part of the insulating system (3) at least the surfaces of the thermal insulation (4), which face outwardly in the installed position, are sealed with a cryogenic vapour barrier of elastomer mastic.

22. A fixed-point pipe support according to claim 1 characterised in that the outwardly facing surfaces of the thermal insulation (4) are sealed with a laminated aluminium/polyester film.

23. A fixed-point pipe support according to claim 22 characterised in that the film is of such a dimension that in the installed condition it at least partially covers over a pipeline insulation adjoining the fixed-point pipe support.

24. A fixed-point pipe support according to claim 1 characterised in that the outer shell (2) is fixedly connected to the base (B) for fixing the fixed-point pipe support.

25. A fixed-point pipe support according to claim 2 characterised in that the thermal insulation (4) and the outer shell (2) have a common division plane (E).

26. A fixed-point pipe support according to claim 16 characterised in that the screw connection (5) is biased by way of a spring device.

27. A fixed-point pipe support according to claim 1 characterised in that the axial ribs (15) respectively bear with their ends against a side face of the peripheral ribs (14) and are fixedly connected thereto.

28. A fixed-point pipe support according to claim 1 characterised in that the inner receiving means (13) has at least one peripherally extending rib (14) and at least one axially extending rib (15).

29. A fixed-point pipe support according to claim 27 characterised in that the inner receiving means (13) has at least two peripheral ribs (14) arranged at a mutual spacing and four axial ribs (15) uniformly over the periphery, and the inner receiving means (13) is divided into two receiving means halves, wherein its division plane (E) extends perpendicularly to the cross-sectional plane and contains the longitudinal axis of the receiving means (12,13).

30. A fixed-point pipe support according to claim 29 characterised in that the four axial ribs (15) respectively bear with their ends against a side face of the at least two peripheral ribs (14) and are fixedly connected thereto.

31. A fixed-point pipe support according to claim 29 characterised in that the insulating system (3) is provided with recesses (17) which are adapted to the ribs (14, 15) of the inner means (13) and into which the ribs (14, 15) of the inner means (13) engage in the installed condition.

* * * * *